United States Patent

[11] 3,590,380

[72] Inventors Leo Eduard Zegers; Wilfred Andre Maria Snijders; Jan Kuilman, all of Emmasingel, Eindhoven, Netherlands

[21] Appl. No. 800,428
[22] Filed Feb. 19, 1969
[45] Patented June 29, 1971
[73] Assignee U.S. Philips Corporation New York, N.Y.
[32] Priority Feb. 23, 1968
[33] Netherlands
[31] 6802652

[54] REPEATER STATION FOR INFORMATION SIGNALS CONTAINING PSEUDO-RANDOM AUXILIARY SIGNALS
6 Claims, 2 Drawing Figs.

[52] U.S. Cl. ........ 325/13, 325/40, 325/42, 179/15 AD, 178/70
[51] Int. Cl. ........ H03k11/00; H03k 13/32
[50] Field of Search ........ 179/15 BY, 15 BS, 15 AP, 15 R; 325/2, 3, 9, 13, 38 A, 40, 42; 178/70; 328/164

[56] References Cited

UNITED STATES PATENTS

| | | | |
|---|---|---|---|
| 3,086,080 | 4/1963 | Raisbeck | 325/13 |
| 3,153,701 | 10/1964 | Oshima et al. | 179/15 APR |
| 3,414,688 | 12/1968 | Hermes et al. | 178/70 |
| 3,457,508 | 7/1969 | Rowlands et al. | 178/70 |
| 3,491,298 | 1/1970 | Jager et al. | 325/13 |

*Primary Examiner*—Robert L. Griffin
*Assistant Examiner*—James A. Brodsky
*Attorney*—Frank R. Trifari

ABSTRACT: A repeater station for a composite pulse information signal and a pseudo-random auxiliary signal has a local pseudo-random generator synchronized with the received auxiliary signal. The output of the local generator is combined with the proper amplitude with the output of a pulse regenerator to yield a regenerated output signal.

INVENTORS
LEO E. ZEGERS
WILFRED A.M. SNIJDERS
JAN KUILMAN
BY
[signature]
AGENT

INVENTORS
LEO E. ZEGERS
WILFRED A.M. SNIJDERS
JAN KUILMAN
BY [signature]
AGENT

REPEATER STATION FOR INFORMATION SIGNALS CONTAINING PSEUDO-RANDOM AUXILIARY SIGNALS

A prior application, Ser. No. 663,783, filed Aug. 28, 1967 describes a transmission system comprising a transmitter and a receiver for the transmission of information in a prescribed transmission band. The overall information to be transmitted consists of a main information signal, in the form of a synchronous pulse series, and an associated auxiliary information signal of smaller information content which is formed by a periodic and synchronous pulse pattern. The auxiliary signal is located within the frequency band of the main information signal and is uncorrelated with the main information signal and has a clock frequency which is equal to the clock frequency of the synchronous pulse series serving as a main information signal. The pulse pattern originating from an auxiliary information source is constructed as a pulse pattern generator and is combined with the main information signal in the transmitter in a linear combination device without frequency separation and without time separation. In the receiver the main information signal and the pulse pattern located within the frequency band thereof and combined linearly therewith are applied in common to a modulation device to which also the locally obtained pulse pattern is applied which originates from a local pulse pattern generator corresponding to the pulse pattern generator in the transmitter. The output of the modulation device is connected to a smoothing filter which for automatic phase correction is connected to a frequency determining member of the local pulse pattern generator. A regenerative repeater is provided in said transmission system in the transmission path between transmitter and receiver for amplification of the overall information to be transmitted consisting of the main information signal in the form of the synchronous pulse series to be transmitted and the uncorrelated pulse pattern serving as an auxiliary information signal.

In spite of a considerably lower level of the auxiliary information signal relative to that of the main information signal for example, −25 db., the main information signal has a slight influence on the phase stabilization of the local pulse pattern generator and this influence may still further be reduced by converting the main information signal in the form of a bivalent pulse series into a multivalent pulse series in a code converter. It is possible to make advantageous use of a code converter which comprises a linear combination device to which the pulses are applied on the one hand directly and on the other hand through a shift register having more than two cascade-arranged shift register elements, the contents of which are shifted by a clock pulse generator connected to the pulse pattern generator. The original bivalent pulse series can then be recovered from the multivalent pulse series at the receiver end by using the corresponding inverse code inverter.

Linear repeaters may be used for amplification of both the main information signal and the auxiliary information signal during their transmission through the transmission path from the transmitter to the receiver, but as a result an influence of quality is introduced in the transmission of the main information signal and the auxiliary information signal which is transmitted at a considerably lower level, which influence of quality increases in a disturbing manner, particularly when signals are transmitted over large distances and hence at a large number of linear repeaters.

It is an object of the invention to provide a regenerative repeater of a different conception in a transmission system of the type described in which the said difficulties are greatly obviated and which regenerative repeater is distinguished by its particular flexibility at time multiplex transmission, the through-connection of channels to further time multiplex systems and the inspection of the regenerative repeaters becoming very simple, notably in case of time multiplex transmission.

The device according to the invention is characterized in that the regenerative repeater comprises a pulse regenerator controlled by locally generated clock pulses for amplification of the pulse series transmitted as a main information signal and furthermore a bypass circuit connected between input and output of the pulse regenerator and including a local pulse pattern generator corresponding to the pulse pattern generator at the transmitter end. The local pulse pattern generator is stabilized in phase by a control voltage obtained by modulation in a modulator of the overall received information and the periodic pulse pattern generated in the local pulse pattern generator. The clock pulses for controlling the pulse regenerator for amplification of the pulse series serving as a main information signal being derived from a clock pulse generator included in the local pulse pattern generator, while the outputs of the pulse regenerator and the local pattern generator are connected through a linear combination device to the transmission path.

In order that the invention may be readily carried into effect it will now be described in detail by way of example with reference to the accompanying diagrammatic drawings, in which:

FIG. 1 shows a transmission system according to the invention, while

Figure 1:
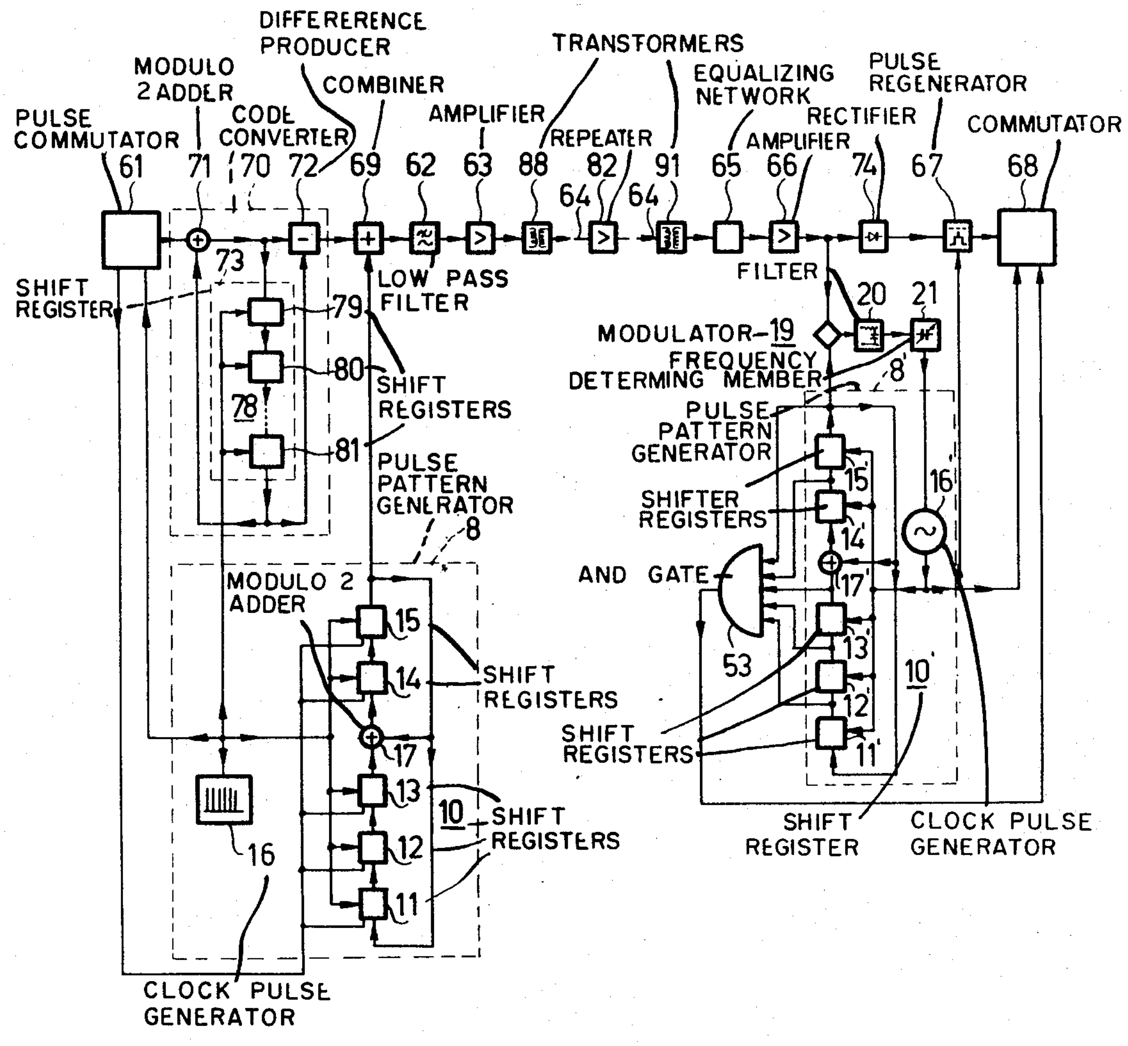

FIG. 1 shows a transmission system according to the invention which is constructed for the transmission in a prescribed frequency band of 0—0.75 mc./s. of a main information signal in the form of bivalent synchronous pulses the alternate presence and absence of which characterize the main information signal and the instants of occurrence of which coincide with a series of equidistant clock pulses with a clock pulse period D corresponding to a frequency of 1.5 mc./s., which clock pulses originate, for example, from a clock pulse generator 16. Furthermore, the bivalent pulses are arranged in successive groups each consisting, for example, of 31 elements, originating from one of 31 time multiplex channels which are connected to a pulse commutator 61. The 31 time multiplex channels are not further shown in the figure.

In this transmission system the pulse signals originating from the pulse commutator 61 are applied through a lowpass filter 62 having a limit frequency $f_o$ equal to half the clock pulse frequency ($f_o$=/2$D$=0.75 mc./s.) and an amplifier 63 to a transmission path in the form of a cable 64 and transmitted to the receiver in which are arranged successively an equalizing network 65 to equalize the amplitude and phase characteristics of the transmission path 64, an amplifier 66, a pulse regenerator 67 to regenerate the received signal pulses according to shape and instant of occurrence, and a pulse commutator 68 which distributes the received pulse signals over 31 receiving channels now shown in the figure.

In addition to the main information signal a group synchronization signal is also transmitted in this transmission system for marking the instant of beginning of each pulse group of 31 elements in order that the pulse commutator 68 may recognize the instants of beginning of each pulse group. Thus the overall information to be transmitted consists of a main information signal in the form of the bivalent pulse series and an auxiliary information signal in the form of a group synchronization signal the information content of which is much smaller than that of the main information signal.

In order to obtain in the transmission system described a particularly efficient transmission of information, in accordance with said prior application, the auxiliary information signal serving as a group synchronization signal is constituted by a periodic and synchronous pulse pattern, located within the frequency band of 0.75 mc./s. allotted to the main information signal and uncorrelated with the main information signal which pattern originates from a pulse pattern generator 8 in the transmitter and which is combined in a linear combination device 69 without time separation and without frequency separation with the main information signal.

The pulse pattern generator 8 in the transmitter is constructed as a fed-back shift register 10 having a number of shift register elements 11, 12, 13, 14, 15 the contents of which are shifted by the clock pulse generator 16 connected to the shift register with a constant shift period D corresponding to the clock pulse frequency of 1.5 mc./s., and with a modulo-2-adder 17 incorporated between the shift register elements 13, 14, the output of the shift register 10 being connected on the one hand to the second input of the modulo-2-adder 17 and on the other hand to the input of the shift register 10. When, in switching on the pulse pattern generator 8 a starting pulse, for example, originating from a starting pulse source, is applied to the input of the shift register 10, the shift register 10 will start generating a series of pulses as a result of the feedback coupling having an each time recurrent period T, which as explained in said prior application, with the shift register in FIG. 1 has the length of $T=(2^5-1)D31D$.

With the instant of beginning of a pulse group in the main information signal a given condition of the shift register 10 in the pulse pattern generator 8 is coupled which condition, as is known, occurs only once per period $T$ of the generated pulse pattern. For that purpose, in the embodiment shown, a group synchronization pulse occurring at that instant at a separate output of the pulse commutator 61 is applied to all the shift register elements 11, 12, 13, 14, 15 through separate inputs so as to bring the shift register 10 in that condition in which simultaneously a pulse appears at the output of all the shift register elements 11, 12, 13, 14, 15. The pulse pattern appearing at the output of the pulse pattern generator 8 is added with a level of, for example, 25 db. below that of the main information signal, in the linear combination device 69, to the main information signal within the prescribed frequency band of 0.75 mc./s.

In the cooperating receiver the main information signal and the pulse pattern which is located within the frequency band of 0.75 mc./s. allotted thereto and linearly combined therewith are applied in common to a modulation device 19 to which also the locally obtained pulse pattern is applied originating from a local pulse pattern generator 8' corresponding to the pulse pattern generator 8 in the transmitter, the output of the modulation device 19 being connected to a smoothing filter 20, which for automatic phase correction is connected to a frequency determining member 21 of the local pulse pattern generator 8'.

In the receiver shown in FIG. 1 the local pulse pattern generator 8' is constructed in the same manner as the pulse pattern generator 8 in the transmitter, corresponding elements being denoted by the same reference numerals which are provided, however with an index. Furthermore, the modulation device 19 is constructed as a product modulator one input of which is connected to the receiving amplifier 66 and the other input to the local pulse pattern generator 8', the output being connected to a smoothing filter in the form of an integrating network 20 the output voltage of which controls a frequency corrector 21 constructed, for example, as a variable reactance which is connected to an oscillator 16' serving as a local clock pulse generator. To the product modulator 19 is applied on the one hand the received signal consisting of the main information signal and the pulse pattern serving as auxiliary information and on the other hand the local pulse pattern which corresponds in shape but does not correspond in phase with the pulse pattern generated at the transmitter end.

As is described in detail in prior application an integration voltage will be formed at the output of the integrating network 20 on the basis of the uncorrelated condition of the main information signal and the pulse pattern, which voltage in the case of coincidence of the two pulse patterns assumes a maximum value and in the case of mutual time shifts of the pulse patterns smaller than the shift period $D$ is proportional to these time shifts but for larger mutual time shifts has a constant minimum value. By applying said integration voltage as a control voltage to the frequency corrector 21 an accurate phase stabilization of the local pulse generator 16' at the phase of the pulse pattern generated at the transmitter end is obtained.

At the receiver end, for generating the local group synchronization signal, the instant of beginning of a pulse group in the main information signal is derived from a given condition of the shift register 10' in the local pulse pattern generator 8'. For that purpose, in the embodiment shown, the output of each shift register element 11', 12', 13', 14', 15' is connected to an individual input of an AND gate 53, which supplies an output pulse only when simultaneously at the output of each shift register element 11', 12', 13', 14', 15' a pulse appears and applies this output pulse to the pulse commutator 68 as a group synchronization pulse. As a result of the phase stabilization of the local clock pulse generator 16' the local pulse pattern coincides with the pulse pattern generated at the transmitter end, and hence the conditions of the shift registers 10 and 10' respectively, at the transmitter and receiver ends are the same at any instant so that the group synchronization pulses occurring at the output of the AND gate 53 accurately coincide with the group synchronization pulse supplied by the pulse commutator 61 at the transmitter end. The clock pulse of the local clock pulse generator 16' are applied to the load 68 and are also used for controlling the pulse regenerator 67.

In order to reduce the possibility of insufficient or wrong phase stabilization it is of advantage to increase the difference between the main information signal and the group synchronization signal, which two signals are constituted in the transmission system described thus far by bivalent pulse series, by converting the main information signal into a multivalent pulse series. For that purpose in the transmitter the main information signal is applied to a code converter 70 which converts a bivalent pulse series into a trivalent pulse series. In the embodiment shown the code converter 70 comprises a linear difference producer 72 to which the pulses are applied on the one hand directly and on the other hand through a shift register 73 and the content of which is shifted by the clock pulse generator 16 connected to the shift register 73, while the linear difference producer 72 is preceded by a modulo-2-adder 71, the second input of which is connected to the output of the shift register 73 and the output of which is connected to the input of the linear difference producer 72, in order that a very simple inverse code converter in the form of a two phase rectifier 74 for recovering the original bivalent pulse series at the receiver end is sufficient. In the embodiment shown the number N of the shift register elements 79, 80...81 in the code converter 70 is equal to the number of the shift periods $D$ occurring per period $T$ of the generated pulse pattern which in the present period of the pulse pattern $T=31D$ means a number of shift register elements $N=31$ and a total delay time $V=ND=31D$.

The code inverter 70 shown reduces the influence of the main information signal on the phase stabilization of the local clock pulse generator 16' at the receiver end to a considerable extent. In fact, in the conversion of the main information signal consisting of bivalent pulses into the trivalent pulse series single spectral zero points were generated in the transmitted frequency spectrum at the frequencies $f=k/ND=k/31D$ with $k=0, 1, 2, 3,...,$ while the auxiliary information signal in the form of the periodic pulse pattern with a period $T=31D$ has a line spectrum with exclusively frequency components at the frequencies $f=k/T=k/31D$ with $k=0, 1, 2, 3, ....,$ so that the frequency components of the auxiliary information signal in the form of the periodic pulse pattern coincide accurately with the single zero points in the spectrum of the coded main information signal.

For the transmission of the transmitted signals from the transmitter to the receiver a repeater 82, which may be constructed as a linear repeater, is incorporated in the transmission path 64 for amplification of both the main information signal and the auxiliary information signal of −2.5 db. lower level. In accordance with the invention a different method was followed in the construction of the regenerative repeater 82 as is illustrated more in detail, in FIG. 2.

Figure 2:
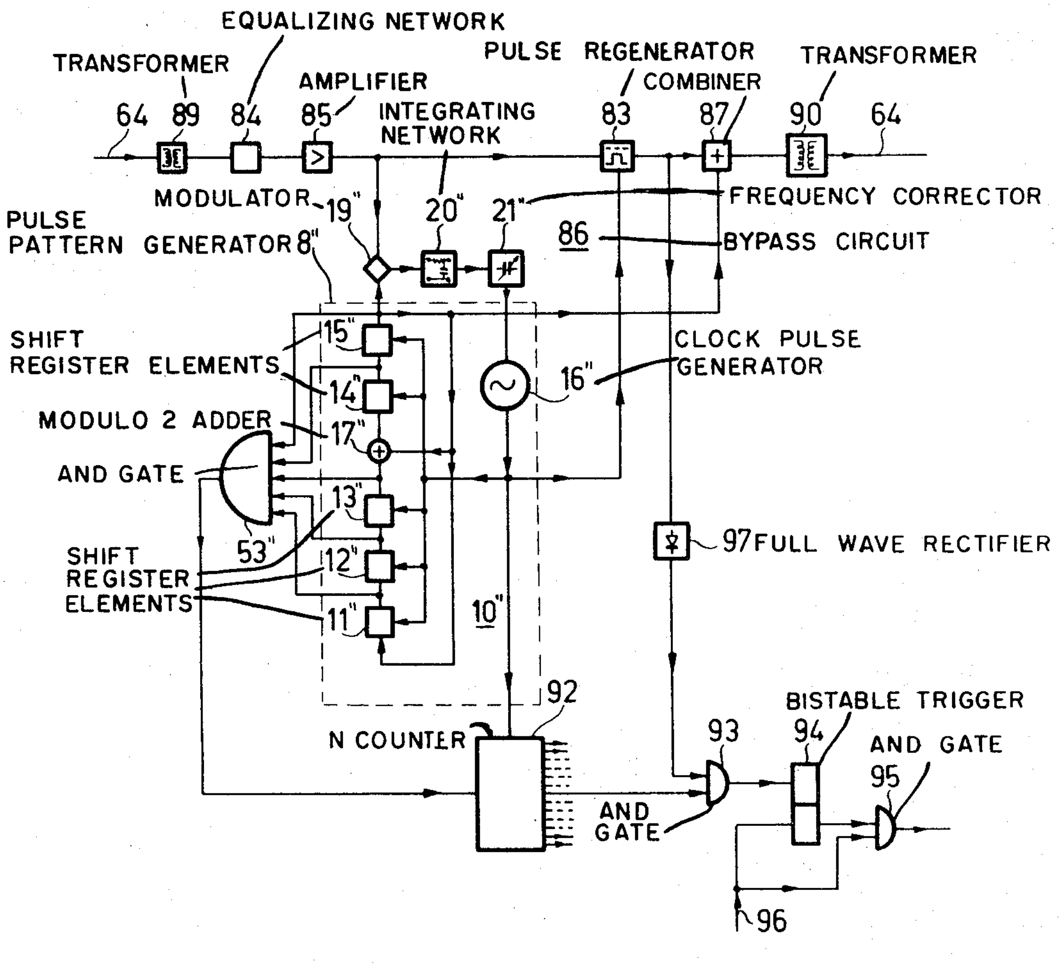
FIG. 2 shows more in detail the regenerative repeater in a block diagram.

For amplification of the received signals the regenerative repeater 82 of FIG. 2 includes a pulse regenerator 83 controlled by clock pulses for amplification of the multivalent pulse series transmitted as a main information signal, the received signals being applied through an equalizing network 84 and an amplifier 85 to the input of the pulse regenerator 83. Furthermore a bypass circuit 86 incorporating a local pulse pattern generator 8'' is connected between input and output of the pulse regenerator 83, said pulse pattern generator being stabilized in phase by a control voltage obtained by modulation of the overall received information and the periodic and synchronous pulse pattern in a product modulator 19'' generated in the local pulse pattern generator 8'', the clock pulses for controlling the pulse regenerator 83 for amplification of the pulse series serving as a main information signal originating from a clock pulse generator 16'' incorporated in the local pulse pattern generator 8'', the output voltage of the local pulse pattern generator 8'' being combined in a combination device 87 with the output voltage of the pulse regenerator 83 for further transmission through the transmission path 64. Particularly the level of the local pulse pattern applied to the combination device 87 is brought possibly by means of an attenuator to the previously mentioned lower level of −25 db. relative to the main information signal.

In the embodiment shown the local pulse pattern generator 8'' is constructed in exactly the same manner as in the transmitter and receiver already described, in which corresponding elements are denoted with the same reference numerals but are provided with a double index. Particularly the pulse pattern generator 8'' comprises a fed-back shift register having five shift register elements 11''—15'', a modulo-2-adder 17'' and the clock pulse generator 16'' which shifts the contents of shift register elements 11''—15'', the clock pulse generator 16'' being stabilized in phase in the same manner as in the receiver of FIG. 1 by the control voltage generated in the product modulator 19'', which voltage controls a frequency corrector 21'' connected through an integrating network 20'' to the clock pulse generator 16''. Without notably being influenced by the main information signal, an accurate phase stabilization is obtained and as a result a synchronization of the pulse pattern generated by the local pulse pattern generator 8'' with the pulse pattern generated at the transmitter end so that the output signal of the local pulse pattern generator 8'' can directly be applied to the combination device 87 for further transmission through the transmission path 64.

In addition to the function of amplification of the main information signal and the auxiliary information signal, which is the only function performed by a linear amplifier, a pulse regeneration is also obtained with the regenerative repeater of FIG. 2, so that pulse distortions and variations in instant of occurrence of the pulses of the main information signal and the auxiliary information signal caused in the transmission path 64, are corrected in the regenerative repeater as a result recovered which an optimum quality of transmission from the transmitter to —obtained. This also made it possible to obtain an optimum efficiency of transmission; in fact, experiments have shown that the transmitter, the receiver and the regenerative repeater may be connected without difficulty to the transmission path 64 through adapter transformers 88, 89, 90, 91. In the embodiment shown for example, adapter transformers were used which have a straight frequency characteristic in the range of 0.001—2 mc./s.

Since the group synchronization pulse can be recovered in a particularly simple manner in the regenerative repeater described the advantage of a particularly flexible transmission system relative to through-connection of time multiplex channels or remote control particularly in time multiplex transmission is obtained in addition to optimum quality of transmission and efficiency of transmission by using the steps according to the invention. Particularly the group synchronization pulse is recovered by connecting the ends of the shift register elements 11''—15'' to an AND gate 53'' in the manner as already described for the receiver of FIG. 1, the group synchronization pulse being derived from the output of the AND gate 53'' and used for the purpose of through-connection of time multiplex channels and/or control of the regenerative repeater.

For this purpose the regenerative repeater in the time multiplex transmission system having 31 channels shown comprises an N-counter 92 controlled by the clock pulse generator 16'' and having 31 counting positions and 31 outputs corresponding therewith, the N-counter 92 being returned every time to its starting position by the group synchronization pulse of the AND gate 53''. The 31 outputs of the N-counter 92 thus supply output pulses corresponding to the relevant position of the counter.

For the through-connection of a time multiplex channel the regenerative repeater is furthermore provided with a selection gate in the form of an AND gate 93 and connected to an output of the counter, a subsequent memory element 94, for example, a bistable trigger, and a selection gate formed by AND gate 95 and connected to the bistable trigger 94, a connection pulse from a second time multiplex system connected to a further transmission path being applied both to the memory element 94 and to the AND gate 95 through line 96 which connection pulse is, for example, likewise derived from an N-counter. A two-phase, full-wave, rectifier 97 for conversion of the main information signal formed by a trivalent pulse series into the original bivalent pulse series is also connected to the output of the pulse regenerator 83, the output of the two-phase rectifier 97 being connected to the input of the AND gate 93.

If in the device described it is desired, for example, to connect the $k^{th}$ time multiplex channel of the first time multiplex system to the $l^{th}$ time multiplex channel of the second time multiplex channel, then for this purpose the $k^{th}$ output of the N-counter 92 is connected to the AND gate 93 and the $l^{th}$ output of the N-counter of the second time multiplex system is connected through line 96 to the memory element 94 and to the AND gate 95. Thus the pulses of the $k^{th}$ time multiplex channel of the time multiplex system described which are written into the memory element 94 are read out by the $l^{th}$ output of the N-counter of the second time multiplex system and transmitted through the AND gate 95 to its output so that the pulses of the $k^{th}$ time multiplex channel of the first time multiplex system can be derived at the output of the AND gate 95 exactly at the time intervals allotted to the $l^{th}$ time multiplex channel of the second time multiplex system.

When connecting a plurality of time multiplex channels the AND gate 93, the memory element 94 and the AND gate 95 are constructed in a multiple design.

For controlling the regenerative repeater described the memory element 94 and the AND gate 95 can often be omitted, particularly for control purposes it is often sufficient to apply the output pulses of the AND gate 93 through a separate control circuit to an indication device incorporated in the transmitter or the receiver.

We claim:

1. A repeater for a composite signal having a main signal component and a pseudo-random auxiliary signal component of an amplitude substantially below that of said main signal, said repeater comprising an input means for receiving said composite signal from a single transmission line, an output means for supplying a regenerated composite signal, a pulse regenerator coupled to said input means, an adder coupled to said regenerator and said output means, a clock pulse source coupled to said regenerator, means for generating a pseudorandom signal coupled to said clock pulse source and said adder means, and means for synchronizing said generating means with said auxiliary signal component said synchronizing means coupled to said input means, said generating means and said clock pulse source.

2. A repeater as claimed in claim 1 wherein said input and output means, each comprises a transformer.

3. A repeater as claimed in claim 1 wherein said generating means comprises a feedback shift register shifted by said clock pulse source and further comprising a counter coupled to said clock pulse source, means for deriving a group synchronization signal from said shift register coupled to said counter to reset said counter, a selection gate having inputs coupled to said regenerator and said counter respectively.

4. A repeater as claimed in claim 3 wherein said deriving means comprises an AND gate having a plurality of inputs coupled to the shift register elements respectively and an output coupled to said counter.

5. A repeater as claimed in claim 3 further comprising an AND gate having inputs coupled to said counter and said regenerator respectively and an output, and a memory element having an input coupled to said AND gate output and an output coupled to an input of said selection gate.

6. A repeater as claimed in claim 1 wherein said synchronization means comprises a product modulator having inputs coupled to said input means and the output of said generating means respectively and an output, a filter coupled to said product modulator output, and a frequency determining member coupled to said filter and said clock pulse source.